United States Patent
Romaszko et al.

(10) Patent No.: US 11,898,393 B2
(45) Date of Patent: Feb. 13, 2024

(54) METHOD AND DEVICE FOR DETECTING POTENTIAL PINCHES

(71) Applicant: Aptiv Technologies Limited, St. Michael (BB)

(72) Inventors: Mateusz Romaszko, Cracow (PL); Pawel Wojtasinski, Cracow (PL); Grzegorz Wyszynski, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 157 days.

(21) Appl. No.: 17/517,564

(22) Filed: Nov. 2, 2021

(65) Prior Publication Data
US 2022/0154511 A1 May 19, 2022

(30) Foreign Application Priority Data
Nov. 17, 2020 (EP) .................................. 20208152

(51) Int. Cl.
*E05F 15/00* (2015.01)
*E05F 15/40* (2015.01)

(52) U.S. Cl.
CPC .......... *E05F 15/40* (2015.01); *E05Y 2400/354* (2013.01); *E05Y 2400/54* (2013.01); *E05Y 2900/55* (2013.01)

(58) Field of Classification Search
CPC ... E05F 15/00; E05F 5/40; E05F 15/41; E05F 15/42; E05Y 2400/35; E05Y 2400/354; E05Y 2400/356; E05Y 2400/54; E05Y 2400/58; E05Y 2900/55; H02H 7/0851
See application file for complete search history.

(56) References Cited

U.S. PATENT DOCUMENTS

| | | | |
|---|---|---|---|
| 4,641,067 | A | 2/1987 | Iizawa et al. |
| 5,399,950 | A | 3/1995 | Lu et al. |
| 5,734,245 | A | 3/1998 | Terashima et al. |

(Continued)

FOREIGN PATENT DOCUMENTS

| | | |
|---|---|---|
| CN | 101220724 | 7/2008 |
| CN | 202899882 | 4/2013 |

(Continued)

OTHER PUBLICATIONS

"Extended European Search Report", EP Application No. 20208153.5, dated May 11, 2021, 7 pages.

(Continued)

*Primary Examiner* — Chi Q Nguyen
(74) *Attorney, Agent, or Firm* — Harness, Dickey & Pierce, P.L.C.

(57) ABSTRACT

A method for detecting potential pinches caused by at least one powered movable panel between a closed position and an open position, by: measuring a physical quantity at a plurality of panel positions when the panel is moved towards the open position so as to get a first profile, measuring said physical quantity in a reference position, when the panel is moved towards the closed position, and determining an offset value, determining a second profile by shifting the first profile of a shifting value, measuring said physical quantity in a repetitive manner when the panel is moved towards the closed position so as to get a third profile, and detecting a potential pinch if the third profile crosses the second profile.

11 Claims, 7 Drawing Sheets

(56) References Cited

U.S. PATENT DOCUMENTS

| | | | |
|---|---|---|---|
| 5,977,732 | A | 11/1999 | Matsumoto |
| 6,051,945 | A | 4/2000 | Furukawa |
| 6,208,102 | B1 | 3/2001 | Kikuchi et al. |
| 6,239,610 | B1 | 5/2001 | Knecht et al. |
| 6,274,947 | B1* | 8/2001 | Terashima ............ H02H 7/0851 |
| | | | 318/266 |
| 6,362,584 | B1 | 3/2002 | Rogovin |
| 6,573,677 | B2 | 6/2003 | Gerbetz |
| 6,633,147 | B2 | 10/2003 | Gerbetz |
| 6,794,837 | B1 | 9/2004 | Whinnery et al. |
| 8,620,531 | B2 | 12/2013 | Morawek |
| 10,047,553 | B2* | 8/2018 | Shibata .................... H02P 3/08 |
| 10,337,230 | B2 | 7/2019 | Kigoshi et al. |
| 11,454,061 | B2* | 9/2022 | Fujita .................... E05F 15/695 |
| 11,572,728 | B2* | 2/2023 | Kim ......................... B60J 5/105 |
| 11,581,829 | B2* | 2/2023 | Romaszko ............ E05F 15/695 |
| 2002/0101210 | A1 | 8/2002 | Boisvert et al. |
| 2002/0190680 | A1 | 12/2002 | Gerbetz |
| 2003/0051555 | A1 | 3/2003 | Fukumura et al. |
| 2004/0079867 | A1 | 4/2004 | Gallo et al. |
| 2005/0187688 | A1 | 8/2005 | Bigorra et al. |
| 2006/0267453 | A1 | 11/2006 | Sugiura |
| 2006/0293821 | A1* | 12/2006 | Takahashi ............ H02H 7/0858 |
| | | | 701/49 |
| 2008/0079379 | A1 | 4/2008 | Odland et al. |
| 2009/0056385 | A1 | 3/2009 | Maekawa |
| 2010/0039057 | A1* | 2/2010 | Tsai ....................... H02P 7/2805 |
| | | | 318/434 |
| 2011/0210755 | A1* | 9/2011 | Ogawa .................... E05F 15/46 |
| | | | 324/686 |
| 2011/0265381 | A1* | 11/2011 | Guarnizo ............. H02H 7/0851 |
| | | | 318/446 |
| 2012/0032618 | A1 | 2/2012 | Stoeger |
| 2014/0173984 | A1 | 6/2014 | Schlesiger et al. |
| 2014/0239867 | A1 | 8/2014 | Bessho et al. |
| 2017/0113652 | A1* | 4/2017 | Tokudome .......... B60R 25/2054 |
| 2020/0018111 | A1* | 1/2020 | Akbarian ................ E05F 15/73 |
| 2020/0249752 | A1* | 8/2020 | Parshionikar ........... G06F 1/163 |
| 2023/0062859 | A1* | 3/2023 | Gowda ................. E05F 15/695 |

FOREIGN PATENT DOCUMENTS

| | | |
|---|---|---|
| DE | 19601359 | 7/1997 |
| DE | 102009028914 | 3/2011 |
| DE | 102012011117 | 12/2013 |
| EP | 0692856 | 1/1996 |
| EP | 2175330 | 4/2010 |

OTHER PUBLICATIONS

"Extended European Search Report", EP Application No. 21204569.4, dated Mar. 21, 2022, 8 pages.

"Extended European Search Report", EP Application No. 20208151.9, dated Apr. 28, 2021, 7 pages.

"Extended European Search Report", EP Application No. 20208149.3, dated Apr. 30, 2021, 6 pages.

"Extended European Search Report", EP Application No. 20208150.1, dated Apr. 30, 2021, 7 pages.

"Extended European Search Report", EP Application No. 20208152.7, dated May 3, 2021, 6 pages.

"Foreign Office Action", EP Application No. 20208151.9, dated May 31, 2023, 4 pages.

\* cited by examiner

METHOD AND DEVICE FOR DETECTING POTENTIAL PINCHES

CROSS-REFERENCE TO RELATED APPLICATION

This application claims priority to European Patent Application Number 20208152.7, filed Nov. 17, 2020, the disclosure of which is hereby incorporated by reference in its entirety herein.

BACKGROUND

The present disclosure relates to the field of powered movable panel, especially panels or opening and closing members such as power windows, sliding doors or sliding roofs of vehicles, which are provided with anti-pinch mechanisms to provide protection against injuries. More specifically, the present disclosure relates to a method for detecting potential pinches caused by at least one powered movable panel, a pinch detector for implementing said method, a vehicle including such a pinch detector, and a non-transitory computer-readable medium including computer-executable instructions for carrying out the aforementioned method.

Power windows are getting very popular nowadays, even on the budget vehicles. The power window typically uses an electric motor to operate. It is known that children prefer to watch out through windows of the vehicle while trying to put their neck or hands out through the window. If anyone operates the window switch accidentally to close the window; the latter may cause suffocation or injuries to the child. The risk also arises in case of power windows which are programmed to operate without even the need to press the switch, for example when a global closing function is activated.

Windows are moved with clamping forces of up to 350 N. This means that a thin glass plate of only about 8 mm thickness can press up to 35 kg e.g. onto a child's hand or head. It takes just 98 N to suffocate or injure a small child. To avoid such mishaps, engineers invented the anti-pinch technology.

The anti-pinch technology of a power window has to meet standards typically issued by countries such as the United States and the European Union states. In some of such countries, the maximum force a power window is allowed to exert on any object is 100 N. Compliance with this limit must be monitored and enforced in a range of 4 mm to 200 mm minimum from the top window frame. It is also important to deactivate the anti-pinch algorithm immediately before the window seal is reached (distance 4 mm from top seal), so that the window can close completely. In addition, to avoid overload and damage to the window motor, blocking must not last too long.

To control anti-pinch in power window, some known solutions are based on measurement of pinching force caused by the power window when it is closed. However, such a way can be regarded as an indirect solution since it requires an additional device for measuring the window force.

Document US2014239867 discloses a pinch detection apparatus which has a reference data storage portion calculating load data on the basis of a rotation speed of the motor actuating the window and an environmental temperature.

Document US2003051555 discloses a solution based on the calculation of reference motor torque using voltage and speed measurements. To this end, it requires at least one dedicated speed sensor, such as an encoder or a Hall effect sensor, which determines the rotational speed of the motor. A voltage sensor provides information to a force calculator which calculates the motor force. A difference between an actual force and a reference force can thus be determined. A pinch condition is indicated by a pinch detector if the force difference exceeds a predetermined threshold.

Document U.S. Pat. No. 6,239,610 discloses a solution based on the voltage induced in the armature motor of the electric drive system used for moving the window.

Requiring additional equipment such as force or speed sensors, involves additional costs, takes more space in relatively confined areas, and does not allow to increase the reliability of the entire system. To overcome these drawbacks, document CN101220724A suggests a solution requiring no sensor. To this end, it discloses a method in which a sampling resistance and a magnifying filter circuit are adopted to obtain the armature current signal of a motor used for moving the window. The armature voltage of the current is obtained by an amplifier. A chip utilizes an A/D converter to obtain the digital values of the armature voltage and current. The rotation speed of the motor is obtained thanks to a functional relationship based on the armature voltage and current. The rotor position is calculated by the integral of the rotation speed and thereby the position of the window can be obtained. The chip can determine if the motion of the window is obstructed thanks to a motion condition and the window position. Accordingly, no sensor is required in this solution.

Most of known solutions are based on comparisons of data measured when closing the window with pre-stored factory values set by the manufacturer. However, such an approach fails to consider the impact of temperature and aging of materials such as gaskets and other plastic components for example. Expansion and change in the coefficient of friction or sliding of the materials in contact with the window have non-negligible influences that distort the comparisons, especially because factory values were established under different conditions.

Accordingly, there is a need for improving existing anti-pinch solutions in order to at least partially overcome the aforementioned issues and drawbacks, especially to improve safety on board the vehicle while complying with the most stringent regulations.

SUMMARY OF THE SOLUTION

To address this concern, the present disclosure suggests, as a first aspect, a method for detecting potential pinches caused by at least one powered movable panel, said panel being movable in a panel-position domain between a closed position and an open position. This method comprising: (i) measuring a physical quantity, representative of a panel movement, at a plurality of panel positions when the panel is moved towards the open position, and recording related values of said physical quantity so as to get a first profile of said physical quantity in the panel-position domain, (ii) measuring said physical quantity in at least one of said panel positions, referred to as a reference position, when the panel is moved towards the closed position, (iii) determining, for said reference position, an offset value between the value of the physical quantity measured when the panel is moved towards the closed position and the value of the physical quantity measured when the panel was moved towards the open position, (iv) determining a second profile by shifting the first profile of a shifting value derived from the offset value, (v) measuring said physical quantity in a repetitive manner in the panel-position domain when the panel is moved towards the closed position, so as to get a third profile, and (vi) detecting a potential pinch if the third profile crosses the second profile.

Thanks to the above solution, the window downward movement can be used as calibration process for generating and storing an up-to-date profile of a physical quantity representative of this movement. Indeed, the profiles of a physical quantity representative of the window movement do not substantially differ when the window is open or closed. Only a shift of this physical quantity can be observed when the window is closed compared to the opposite situation where the window is open. Thus, this approach ensures that an up-to-date profile is available, namely a profile that depends on the current (i.e. actual) physical characteristics of the materials involved during the closure movement. This allows considering the conditions of the moment, especially in terms of temperature, supply voltage e.g. depending on the battery charging level, and aging of the seals. In addition, this solution is advantageously simple, fast, and easy to deploy at a final hardware stage.

According to one embodiment the panel-position domain has at least one first exclusion zone, at least bounded by one of extremities of the panel-position domain, and preferably at least one second exclusion zone, at least bounded by one of an activation of the powered movable panel and a deactivation of the powered movable panel, in which the value of the physical quantity is neither recorded nor set to a default value, but is a missing value.

Preferably, one of the first exclusion zones extends over a range of 4 mm from a fully closed position and, if any, the other first exclusion zone extends over a range from a fully open position which does not extend beyond 200 mm from the fully closed position.

According to another embodiment, the potential pinch is detected if the third profile crosses the second profile during at least a predetermined time interval.

In a further embodiment, measuring the physical quantity when the panel is moved towards the closed position is carried out on a substantially continuous basis or according to a measuring step size which is lower than a recording step size applied for recording, on a punctual basis, the values of said physical quantity when the panel is moved towards the open position.

In another embodiment, the method further has a step for checking whether there is at least one missing value and, if so, replacing said missing value with the value of the closest physical quantity that has been recorded if the missing value is within a first exclusion zone, otherwise (i.e. if the aforementioned missing value is not within the first exclusion zone): (i) determining a line segment linking, in the first profile, the two closest recorded values which are located on both sides of the missing value(s), and (ii) replacing each missing value with a substitute value corresponding to the value defined by the line segment at the panel position of said missing value.

In one embodiment, if the missing value is not within the first exclusion zone, the following steps are also performed: (i) checking whether a difference in value of the physical quantity between the two closest recorded values is greater than a first threshold multiplied by a factor equal to a number of missing values increased by one and, if so, (ii) determining, between said two closest recorded values, a plurality of substitute values located on the line segment and determined according to a step size which is finer than the recording step size applied for recording the values of the physical quantity in the panel-position domain.

Preferably, the physical quantity is a panel movement speed or an armature current of an electric motor used to operate the panel.

According to another embodiment, the first profile is made up of a stepped line successively connecting the values of said physical quantity, preferably in accordance with the opposite order of their recording.

Preferably, the method further comprising a correction process for correcting at least one portion of the first profile, said correction process comprising: (i) calculating the differences in value of the physical quantity between each adjacent panel positions, (ii) performing a first correction process for replacing, with a single substitute line segment, each portion or set of successive portions of the first profile which is bounded by values involved (i.e. used) in a difference in value which is greater or equal to a first threshold value.

In a further embodiment, the correction process further has: (i) determining, for each substitute line segment and at each panel position crossed by said substitute line segment, a second difference in value of the physical quantity between the first profile and the substitute line segment, and (ii) performing a second correction process for replacing the single substitute line segment with a broken line which successively links, for said portion, each of the values of the physical quantity of the first profile which has caused the second difference in value to be greater than or equal to a second threshold value.

According to a second aspect, the present disclosure relates to a pinch detector for implementing the method for detecting potential pinches caused by at least one powered movable panel according to any of embodiment or possible combination of embodiments of the related method, said panel being movable by an actuator in a panel-position domain between a closed position and an open position, the pinch detector comprising: (i) a first measuring device for obtaining measurements of a physical quantity representative of a panel movement, (ii) a second measuring device for obtaining measurements of panel positions during movement (i.e. for receiving panel positions in the panel-position domain), (iii) a saving device for storing values provided by the first measuring device in relationship with the panel positions provided by the second measuring device, and (iv) a processing device for performing calculation tasks and determining profiles of said physical quantity in the panel-position domain, at least a part of said profiles being determined using mathematical functions applied on the values of the physical quantity and on the panel positions.

In one embodiment, the pinch detector generates a control signal for controlling at least one of the two actions of stopping the movement of the powered movable panel and moving the powered movable panel towards the open position.

In a third aspect, the present solution relates to a vehicle comprising the pinch detector according to any of its embodiment or combination of its embodiments.

In a fourth aspect, the present solutions relates to a non-transitory computer-readable medium comprising program instructions for causing a processor to execute the method according to any of its embodiment or any possible combination of its embodiments.

Other embodiments and advantages will be disclosed hereafter in the detailed description.

BRIEF DESCRIPTION OF THE DRAWINGS

The solution and the embodiments suggested in the present disclosure should be taken as non-limitative examples and will be better understood with reference to the attached Figures in which.

DESCRIPTION OF PREFERRED EMBODIMENTS

The solution proposed in this presentation is primarily applied to a power window of a motor vehicle. However, it should be understood that it is neither limited to a power window, nor limited to be mounted on a motor vehicle. Indeed, the powered movable panel may refer to any kind of motorized panel, for example a sliding roof or door of a space that can be closed, a sliding swinging or tilting gate, an electrical garage door or a sliding door of a van.

Figure 1:
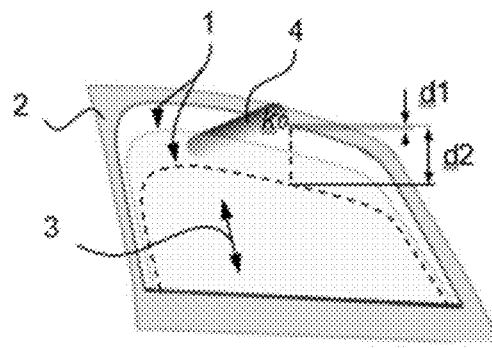
FIG. 1 is a schematic representation of a scene showing a pinch of an object in a car door window.

In the example of FIG. 1, a power window of car door is shown as powered movable panel 1, namely as a powered opening and closing member. The door may be regarded as an armature or a fixed frame 2 relative to the panel 1. This panel 1 is movable, along a panel stroke, between a closed position and an open position. The closed position may be a fully closed position, namely a position that completely closes the frame 2. Similarly, the open position may be a fully open position, namely the most open position available within the frame 2. Alternatively, the open and closed positions may refer to partly open and partly closed positions. In FIG. 1, the window movement is a vertical movement according to the double arrow 3, where the closed position is located at the top of the frame 2 or near the top of the frame, and the open position is located at the bottom of the frame 2 or near the bottom of this frame.

In the automotive field, the anti-pinch technology of a power window has to meet standards issued by the European Union and the United States, among others. The maximum force a power window is allowed to exert on any object acting as obstacle 4 is 100 N. Compliance with this limit must be monitored and enforced in a range of 4 mm to 200 mm minimum from the top window frame as it is shown in FIG. 1 respectively through the distances d1 and d2. To allow the window to be completely closed, it is also important to deactivate the anti-pinch system or to make it ineffective immediately before the frame 2 (seal) is reached by the window near its fully closed position. This is the reason why the system will preferably have no effect within a distance of 4 mm from the top of the frame 2. In addition, to avoid overload and damage to the window motor, blocking the window must not last too long, regardless of its position along its stroke.

According to the first aspect, the present solution relates to a method for detecting potential pinches, more specifically at least one pinch or potential pinch, caused by at least one powered movable panel 1. Preferably, the panel 1 is powered by an actuator such as an electric motor. Nevertheless, other kind of actuator may be considered, e.g. pneumatic or hydraulic cylinder or an actuator including a combination of electric and pneumatic or hydraulic elements, if applicable. In the following description, the case of an electrical actuator, especially an electric motor such as a DC motor, will be considered since it is one of the preferred embodiments.

Figure 2:
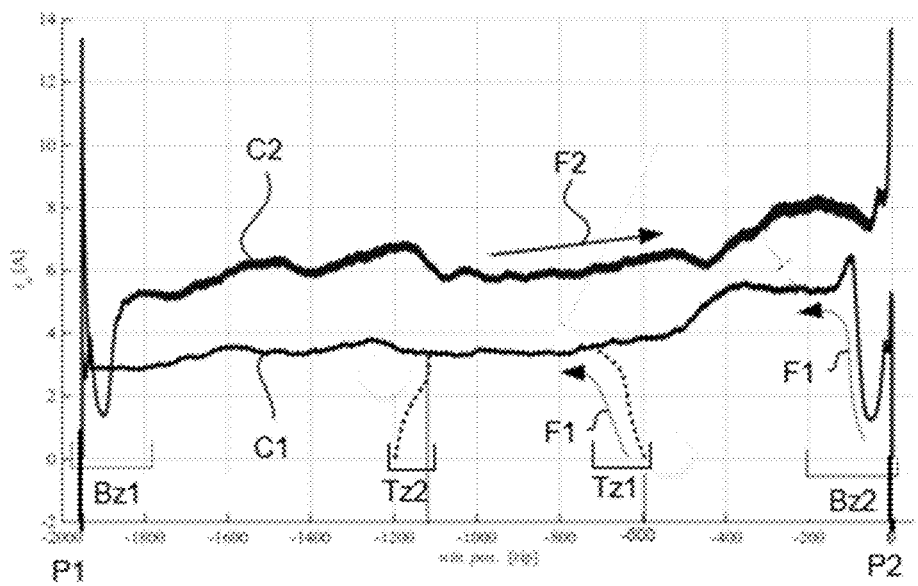
FIG. 2 is a graph showing the armature current variations in an electrical motor during opening and closing movements of a power window.

Referring to FIG. 2, the latter provides a graph showing the armature current ia variations in an electrical motor that has been used as window actuator, during opening and closing movements of the power window 1. More specifically, the lower curve C1 shows the intensity of the armature current ia in the window position domain when the window is moved towards its open position P1, as shown through the arrows F1, whereas the upper curve C2 shows the intensity of the armature current ia when the window is moved towards its closed position P2, as shown through the arrow F2. Accordingly, this graph shows the window positions X [rip] on the X-axis and the armature current intensity [A] on the Y-axis. The intensity values of the armature current ia have been measured in a substantially continuous way during the movements of the window 1. This means that the intensity values have been measured on an almost continuous basis, namely as fast as possible. In practice, the processing speed may typically depend on the clock of the integrated circuit used for performing the tasks of the method. Accordingly, these tasks are executed more or less quickly, especially depending on the clock signal. Therefore, the word "continuous" should be understood in the sense that there is no intentional pause between the measurements or tasks.

The closed position P2, in particular the fully closed position, is located on the right side of the X-axis, whereas the open position P1, in particular the fully open position is located on the left-side of the X-axis. The range between the closed and open positions is referred as the panel-position domain. Accordingly, the panel-position domain may be denoted X-axis. This domain extends e.g. from X=0 to X=−2000 ripples, where the value of 0 ripple corresponds to the fully closed position P2 and the value of −2000 ripples corresponds to the fully open position P1 in this example.

The ripple unity may be regarded as a quantity for defining the position X of the window along its stroke which, in the present example, cannot extend beyond 2000 ripples. More specifically, current fluctuations caused by motor commutations, typically in a DC motor, are referred to as current ripples and may be used, as a sensorless solution, to identify the position of the movable panel (e.g. the powered window) in the panel-position domain X-axis. Other unity such as the millimeter or encoding values may be also used for uniquely defining the position of the window along its stroke, i.e. within the window position domain. Accordingly, any dedicated sensor, such as a Hall sensor for example, may be provided for determining the position of the movable panel in the panel-position domain.

In a known way, there are at least two zones located at the extremities of the window position domain X-axis in which the physical quantity (e.g. ia [A]) representative of the window movement is disturbed. These zones may be also located at the extremities of the window stroke, i.e. at the extremities of the window movement if the window stroke is shorter than the whole time or window position domain. These two zones are referred as blind zones as shown in FIG. 2 through the reference Bz1 (bottom blind zone) and Bz2 (top blind zone). In these two zones, the window is in the final phase of complete closing or opening and, as shown in FIG. 2, there are rapid changes in the current intensity which are not significant in the present method for detecting a potential pinch. Therefore, top, and bottom blind zones will preferably be avoided.

In addition when the window starts moving either towards its open (or fully open position) or towards its closed position (or fully closed position), the armature current intensity is needs a certain time interval in order to be stabilized. Such a phenomenon is due to several parameters such as the inertia of the window (inertia of the powered movable panel 1), the inertia of the motor rotor (or any other actuator), frictions to overcome or the peak current of the motor when starting. This may occur not only within the blind zones Bz1, Bz2, but also at any position X within the time or window position domain. For example, this can occur through transient states Tz of the motor, typically when the motor starts (or accelerates) or when the motor brakes (or decelerates) during a window opening movement. For the same reason as that mentioned in connection with the blind zones, transient zones Tz1, Tz2 resulting from transient states should preferably be avoided.

Figure 3:
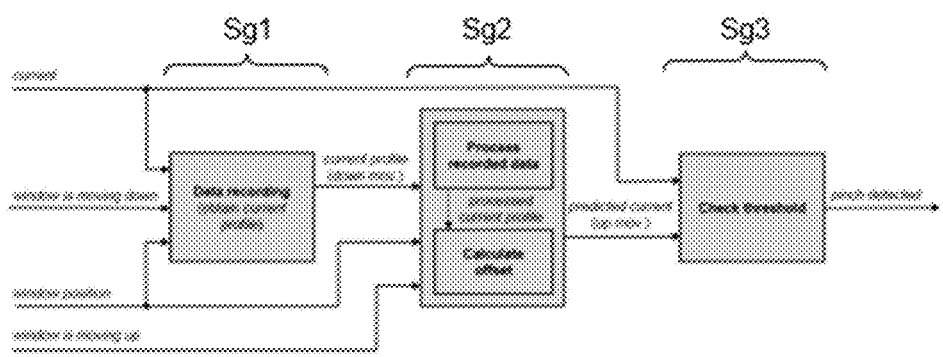
FIG. 3 is a block diagram of an anti-pinch algorithm according to the present solution, FIG. 4A provides the graph of FIG. 1 onto which additional stepped-shape profiles have been added while showing a pinch detection.

FIG. 3 is a block diagram of an anti-pinch algorithm according to the present solution. This Figure provides a schematic overview of the present method for detecting potential pinches according to a preferred embodiment. Three main stages Sg1, Sg2 and Sg3 are shown in FIG. 3. During the first stage Sg1, data is collected and recorded substantially when the powered movable panel 1 moves towards a first position P1 which is also referred to as the open position, more particularly the fully open position. The second stage Sg2 is mainly a processing and calculation stage, and the last stage Sg3 substantially relates to a monitoring stage for detecting any potential pinch when the powered movable panel 1 moves towards a second position P2 which is also referred to as the closed position, more particularly the fully closed position.

Generally speaking, the present method has several steps which will be successively described according to a preferred order. Nevertheless, the steps of the method are not limited to be carried out in the same order if one or more steps could take place in a different order.

The first step aims to measure a physical quantity which is representative of the movement of the powered movable panel 1. Typically, such a physical quantity may be the current of the motor used as actuator, especially the armature current ia of such a motor, as shown in most of the annexed Figures, including FIG. 3. Nevertheless, another physical quantity such as the speed of the panel 1 or the rotational speed n of the motor (actuator) may be also used, as shown in connection with the embodiment of FIG. 5. Measuring the physical quantity (ia, n) is carried out at a plurality of panel positions $X_1, X_2, X_3, \ldots X_n$ when the panel 1 is moved towards the first position P1, i.e. the open position.

The related values Y of the measured physical quantity (ia, n) are recorded or stored so as to get a first profile Pr1 of this physical quantity in the panel-position domain X-axis. In other words, these values Y are recorded so as to obtain data representative of a first profile Pr1 of a feature (i.e. a characteristic or a parameter) in relationship to the panel movement or the effort involved in moving such a panel 1 in the panel-position domain X-axis, i.e. along at least a portion of the panel stroke.

Figure 4A:
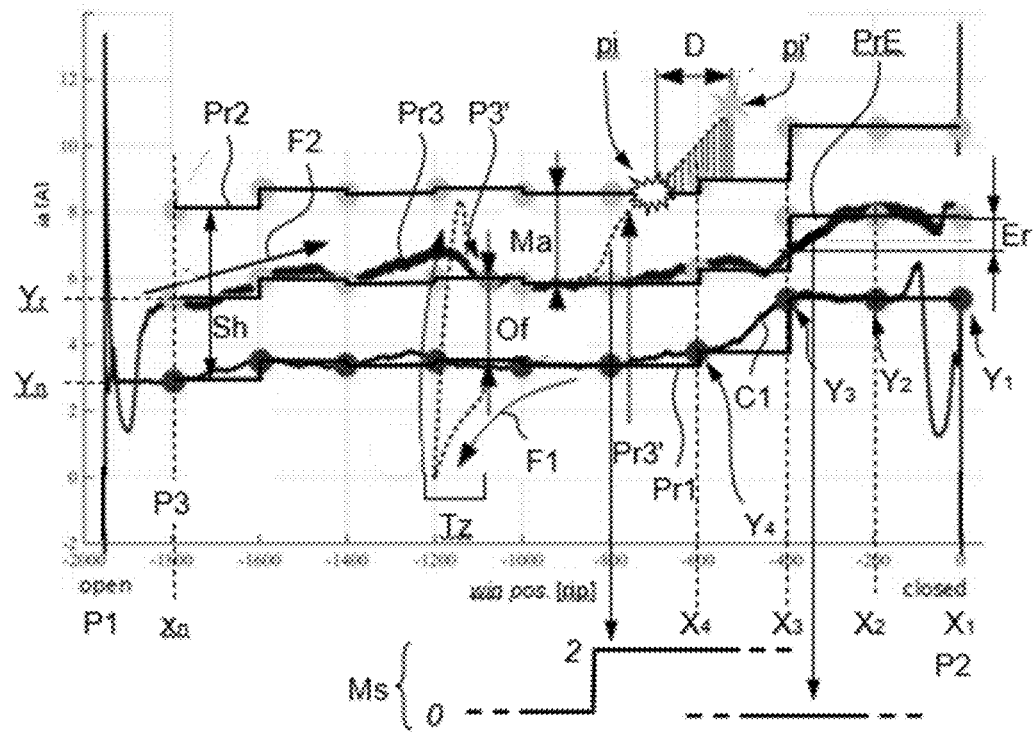
FIG. 4B is a detail of the first profile, of the physical quantity, onto which a missing value is depicted as example in a so-called transient zone.
FIG. 4C is a graph showing, among other things, how blind zone missing points or values are processed.

Such a first profile Pr1 is shown e.g. in FIG. 4A, over the lower curve C1, namely superimposed on the curve C1. Since it is neither necessary to record all measured values, nor necessary to measure the physical quantity is a continuous manner when the movable panel moves towards its open position P1, the first profile Pr1 is made up of a stepped line successively connecting the values Y of the physical quantity, preferably in accordance with the opposite order of their recording.

Preferably, the value of the physical quantity are recorded at a regular interval within the panel-position domain, e.g. in compliance with a step size of 200 ripples, as shown in the example of FIG. 4A. In order to get a first profile Pr1 which fits better with the curve C1, a finer step size such as 100 ripples or less may also be applied. However, decreasing the size step causes more data to be processed and stored, thus requiring more computing resources. Whatever the number of recorded values, each of them is stored in correspondence with the related panel position, e.g. as a pair of data X, Y, where X is the panel position and Y is the value of the physical quantity at the panel position X. Accordingly, the first profile Pr1 can be obtained as a function $Y=f(X)$ of the window position when the movable panel is moved towards its open position P1.

The second step of the method occurs when the movable panel 1 is moved towards the second position P2, namely the closed position. As shown in FIG. 2, the variations of the physical quantity, which in this instance is the armature current ia, corresponds to the upper curve C2. It should be noted that the profiles of the curves C1 and C2 do not differ much from each other. The main difference between these two curves C1, C2 with respect to the Cartesian coordinate system (X, Y), is an offset, i.e. a shifting of the curve C2 relatively to the curve C1. This offset is substantially a shifting in the Y-axis direction.

The main goal of the second step is to measure the physical quantity ia, n in at least one of the panel positions $X_1, X_2, X_3, \ldots X_n$ when the movable panel 1 is moved towards the second position P2, namely the closed position. This position is referred to as a reference position P3 (FIG. 4A). Preferably, the reference position P3 is located close to the last panel position $X_n$ for which a value $Y_n$ of the physical quantity has been recorded when the movable panel 1 moved towards the open position P1. In FIG. 4A, the reference position P3 is located at X=−1800 ripples in the panel-position domain and corresponds to the last panel position $X_n$ for which a value Y (which is approximately equal to 3 Amperes in this example) has been recorded during the first step of the method.

The reference value of the physical quantity at the reference position P3 is noted $Y_r$ in FIG. 4A and corresponds approximatively to 5.5 A (i.e. Amperes) in the present example. Preferably, the reference value $Y_r$ is determined once during panel movement towards the closed position P2. In one embodiment, the reference position P3 can be determined more than once along the panel-position domain. For example, a first reference position P3 is set at position −1800 ripples in FIG. 4A and a second reference position P3' is set at position −1100 ripples in the same Figure. Still preferably, the reference positions P3, P3' are located outside any blind zone Bz and transient zone Tz in order to prevent these reference positions from being altered by disturbances occurring in these zones.

Once the reference value $Y_r$ have been determined, the third step of the method aims to determine, for the reference position P3, the offset value Of between the reference value $Y_r$ and the value $Y_n$ of the first profile Pr1 at position P3. In other words, the offset value Of is the difference, preferably in absolute value, between the value $Y_r$ of the physical quantity (ia, n) measured when the panel 1 is moved towards the closed position P2 and the value $Y_n$ of the physical quantity measured when the panel 1 was moved towards the open position P1. Therefore, the values $Y_r$ and $Y_n$ have the same panel position $X_n$ in the panel-position domain X-axis.

The fourth step of the method aims to determine a second profile Pr2 by shifting the first profile Pr1 of a shifting value Sh, i.e. a shifting amount, which is derived from the offset value Of. Preferably, the shifting value Sh is equal to the addition of the offset value Of with a margin value Ma, as shown in FIG. 4A. The margin value Ma may be determined in advance as a constant value. Alternatively, the shifting value Sh may be determined by multiplying the offset value Of by a coefficient. This coefficient will be preferably always greater than 1 without being limited to natural numbers. Accordingly, this coefficient may be equal to 1.3, 1.5 or to any other number which is part of the set of real numbers for example. In the example of FIG. 4A, the margin value Ma is approximatively equal to the offset value Of so that the aforementioned coefficient would be about 2.

The fifth step of the method intends to measure the physical quantity (ia, n on Y-axis) in a repetitive manner, in the panel-position domain X-axis, when the movable panel 1 is moved towards the closed position P2. The purpose of these measurements is to get a third profile Pr3 as shown in FIG. 4A. In the case where these measures are performed at the same step size as those made in the example of FIG. 2 when the panel 1 is moving towards the closed position P2, then the curve C2 and the third profile Pr3 are the same or are almost identical. Preferably, the measurements of the physical quantity to get the third profile Pr3 are performed on a continuous basis or almost continuous, namely as fast as possible. Still preferably, these measurements are stored, at least temporarily, and/or are processed immediately for achieving the last step of the method.

The sixth or last step of the method aims to monitor the third profile Pr3, so as to detect a potential pinch pi in case where the third profile Pr3 crosses the second profile Pr2, for example as soon as the third profile crosses the second profile. Indeed, the second profile may be regarded as a threshold profile providing a dynamic (i.e. variable) threshold value in the panel-position domain. As shown in FIG. 4A, if no pinch is detected along the entire panel-position domain, the third profile Pr3 corresponds approximatively to an expected profile PrE which may be obtained by shifting the first profile Pr1 by an amount equal to the offset value Of in the Y-axis direction. However, if a pinch pi occurs during the stroke of the movable panel 1 when this latter is moves toward the closed position P2 (as shown by the arrow F2), the third profile Pr3 leaves the expected profile PrE. This is shown in FIG. 4A through the dashed-line portion Pr3' located at the panel positions between −900 and −500 ripples. More specifically, since the physical quantity is the armature current ia of the motor actuating the powered window in the example of FIG. 4A, the values of the current ia significantly increase as soon as there is an obstacle located between the top edge of the window 1 and the frame 2 of the vehicle door. The slope of the third profile portion Pr3' mainly depends on the stiffness $k_0$ of the obstacle 4 (FIG. 1).

Detecting if the third profile Pr3 crosses the second profile Pr2 may be carried out by comparing the value Y of the currently measured physical quantity, i.e. the value of the armature current ia in the example of FIG. 4A, with the corresponding value Y of the second profile Pr2 for the same panel position X. If the currently measured value (Y of Pr3) is greater or at least equal to the value (Y of Pr2) of the second profile for the same position X in the panel-position domain, it means that the third profile Pr3 reaches or crosses the second profile Pr2 at that panel position X. Mathematically, the condition to detect a pinch pi may be written by the following expression: there is a pinch pi if $Y_{Pr3}(X) \geq Y_{Pr2}(X)$ Instead of referring to the second profile Pr2, it may be possible to refer to the first profile Pr1 while considering the shifting value Sh in the aforementioned comparison. In that case, a pinch pi may be detected if $Y_{Pr3}(X) \geq Y_{Pr1}(X)+Sh$. Therefore, the last three steps of the method may be reformulated as follows: (iv) fourth step: determining a shifting value derived from the offset value Of, (v) fifth step: measuring said physical quantity in a repetitive manner in the panel-position domain when the panel is moved towards the closed position P2, and (vi) sixth step: detecting a potential pinch pi if the physical quantity (ia, n) measured, at the current panel position X, when the panel 1 is moved towards the closed position P2 reaches a dynamic threshold, said dynamic threshold being determined by adding or subtracting the shifting value Sh to the value Y provided by the first profile Pr1 for said current panel position X.

Even if at least two different wordings may be used for defining the three last steps of the method, one can note that these wordings are equivalent and have the same effect. In addition, it should be noted that this method may be easily implemented using an algorithm based on mathematical functions, expressions and/or comparisons, and that the order in which some of these operations are executed may vary while obtaining the same result. In any case, the method is simple, quickly provides results with few computing resources and is easy to deploy regarding the required hardware.

Advantageously, this method provides at any time an up-to-date solution given that the physical quantity monitored by the repeated measurements when the movable panel 1 is moved towards its closed position P2 is compared with newly updated values belonging to the first profile Pr1. Preferably, each time the movable panel 1 is moved towards its open position P1, the values of the first profile are updated. Accordingly, the first profile Pr1 considers the last environmental conditions, such as temperature, battery voltage, aging of the joints, gaskets or any part of the mechanism that allows to actuate the movable panel. In other words, each time the panel 1 is actuated according to an opening movement, the algorithm that monitors the movable panel preferably automatically takes into account all of these parameters which may have a significant influence on the detection of any potential pinch during the closing movement of the panel. By recording data of the first profile when the powered movable panel moves towards its open position P1, the present method provides a new approach for efficiently predicting and updating the profile of the monitored physical quantity during the closing movement of the movable panel. In addition, the present solution has the advantage of being easily adaptable to any kind of movable panel.

As shown and discussed in connection with FIG. 2, the panel-position domain has first exclusion zones which have been referred to as blind zones Bz1, Bz2. Each of these first exclusion zones Bz1, Bz2 is at least bounded by one of the extremities of the panel-position domain X-axis. This panel-position domain may further have second exclusion zones which have been referred to as transient zones Tz1, Tz2. Each of these second exclusion zones Tz1, Tz2 is at least bounded by one of activation the powered movable panel and the deactivation of the powered movable panel, i.e. by the position X (in the panel-position domain) which corresponds to the moment when the powered movable panel 1 is turning on and/or turning off.

According to one embodiment, within at least one of the first exclusion zones Bz1, Bz2, and preferably within at least one of the second exclusion zones Tz1, Tz2, the value Y of the physical quantity ia, n is not recorded or set to a default value, but constitutes a so-called missing value or missing point. Indeed, since the physical quantity such as the armature current ia is significantly perturbed for several reasons in the first and second exclusion zones Bz1, Bz2, Tz1, Tz2, it may be preferably to avoid taking into account the values in these particular zones. Still preferably, the measurement of the physical quantity if prevented in these particular zones.

Preferably, one of the first exclusion zones (i.e. Bz2) extends over a range of 4 mm from the closed position P2, more specifically from the fully closed position of the movable panel 1. If any, i.e. if applicable, the other first exclusion zone (i.e. Bz1) extends over a range from the open position P1, in particular from the fully open position of the movable panel 1, which preferably does not extend beyond 200 mm from the closed position P1, in particular from the fully closed position. These ranges of values (4 mm and 200 mm) allow to comply with standards required by some countries while ensuring a correct operation of the anti-pinch mechanism. Depending on the manufacturer or client requirements, the aforementioned other first exclusion (i.e. Bz1) may extend e.g. over a range of 50 mm from the fully open position P1 or may even be reduced to zero.

Preferably, one of the second exclusion zones (i.e. Tz1) extends over a range equivalent to 0.2 to 0.5 seconds from the activation of the powered movable panel 1 (i.e. from the moment the panel is activated) and, if any, the other second exclusion zone (i.e. Tz2) extends over a range equivalent to 0.2 to 0.5 seconds from the deactivation of the powered movable panel 1 (i.e. from the moment the panel is deactivated). These time intervals, which may be converted into ripples (or any other suitable unit) in the time or panel-position domain, provides ranges to avoid taking into account values of the physical quantity in transient states of the actuator (especially the motor) of the movable panel.

For similar reasons, the reference position P3 is preferably located at a panel position X equivalent to at least 0.2 to 0.5 seconds from the activation of the powered movable panel 1. In other words, the reference position P3 is preferably located at a panel position X located outside one of the exclusion zones (e.g. Bz1, Tz2). Preferably, the same is true for any reference position P3, P3'.

According to one embodiment, reference position P3 may be considered several times in the panel-position domain along the stroke of the powered movable panel 1, so as to determine more than once the reference values $Y_r$ (FIG. 4A). In such a case, the third and fourth steps aiming respectively to determine the offset value Of and the second profile Pr2 may be performed each time a reference position P3, P3' has been determined, e.g. for update purposes. By updating the reference value $Y_r$ at different panel positions within the panel-position domain X-axis, the derived values Of, Ma, Sh can be also updated to increase the accuracy of the algorithm.

According to one embodiment, the reference value $Y_r$ is updated depending on two factors. The first factor relates the error Er (FIG. 4A) that may exist between the expected profile PrE and the third profile Pr3 at any position X of the panel along the time and panel-position domain X-axis. This error can be easily determined since it is equal to the difference between these two profiles, so that $Er(X)=PrE(X)-Pr3(X)$.

The second factor relates to the lack of steadiness of the physical quantity which is the armature current ia in the example of FIG. 4A. The lack of steadiness should be regarded as the armature current dynamic changes, namely the local variations of the physical quantity around the panel position X. These variations may be translated into three basic states, namely a constant state, a rising state and a falling state. These states could be transcribed in the form of a signal such as a monitoring signal Ms shown at the bottom of FIG. 4A. This monitoring signal Ms may typically be a square signal which may take three different values, e.g. a first value equal to zero (0) for the constant state (i.e. if there is no variation or if the variations are so small that they can be regarded as being negligible), a second value equal to two (2) for the rising state and a third value equal to one (1) for the falling state. The monitoring signal Ms may be determined in a quite simple way based on the difference between the third profile Pr3, i.e. the signal provided by the armature current ia, and a related profile which may be obtained by using a low-pass filter applied onto the third profile Pr3 (i.e. onto the armature signal ia) in order to obtain a filtered profile.

On the basis of the aforementioned factors, the offset value Of (or the reference value $Y_r$ from which the offset value is derived) may be renewed (i.e. updated or recalculated) if the following two conditions are met. The first condition is that the error Er is greater than or equal to a predetermined error threshold ThE, so that the error Er is considered as being too large. The second condition is that the physical quantity (ia, n) is substantially constant, i.e. that the monitoring signal Ms=0 in the present example. In one embodiment, and as previously suggested, the shifting value Sh is defined by adding a margin value Ma to the offset value Of. The margin Ma is typically determined during a calibration process. It should be noted that the shifting value Sh and the offset value Of preferably refer to positive values, so that when the margin value Ma is added to the offset value Of, the result of this addition provide a value that is greater than each of the margin value and the offset value.

According to one embodiment schematically shown in FIG. 4A, the potential pinch pi is detected if the third profile Pr3 crosses the second profile Pr2 during at least a predetermined time interval or duration D. This is illustrated in FIG. 4A through the pinch pi' which is delayed from the duration D after the pinch pi. In the example of FIG. 4A, the duration D is equivalent to 200 ripples since the pinch pi takes place at about X=−700 ripples and the pinch pi' occurs at about X=−500 ripples. Providing such a time interval D from the third profile Pr3 crosses the second profile Pr2, allows to further avoid false pinches. The time interval D may be less than 0.5 second, preferably less than 0.3 second and still preferably less than 0.2 or 0.1 second.

In another embodiment, measuring the physical quantity when the panel 1 is moved towards the closed position P2 is carried out on a substantially continuous basis or according to a measuring step size which is lower than the recording step size applied for recording, on a punctual basis, the values Y of the physical quantity when the panel 1 is moved towards the open position P1. Indeed, if it is preferable to monitor the closing movement of the panel in a substantially continuous way or with a fine step size for safety reasons, it should be noted that is not necessary to measure and record values of the first profile Pr1 with the same step size. In this way, it is advantageously possible to save hardware resources (e.g. the memory size, the power of the processor in charge of running the anti-pinch algorithm) while ensuring a fast processing of collected data. In addition, it should be noted that monitoring the closing movement may be limited to a critical position interval in the panel-position domain. For example, such a critical position interval may be in a range between 200 mm and 4 mm from the frame 2 located in front of the edge of the panel 1 when it is fully closed.

In a variant, recording the values of the physical quantity may be carried out on a punctual basis according to a predetermined recording step in the panel-position domain. Accordingly, measuring these values may be carried out in a substantially continuous basis, even when the movable panel 1 moves towards the open position, but only some of the measured values may be recorded, preferably on a regular basis, in order to get the first profile Pr1. For example, the recording step may have a step size less than 0.5 second, preferably less than 0.3 second, still preferably less than 0.2 or 0.1 second. According to a preferred embodiment, measuring the physical quantity when the panel 1 is moved towards the open position P1 (i.e. during the first step aiming to get the first profile Pr1), is carried out on the same basis as the recording of this physical quantity (still during the first step).

Missing points Mi can be divided into two groups. First group includes skipped points or not recorded points further named as blind zone missing points MiBz since they are located inside one of blind zones Bz1, Bz2. Second group includes transient zone missing points MiTz located inside transient zone Tz.

According to another embodiment, the method further has a step for checking if there is at least one missing value Mi (especially a blind zone missing value MiBz) and, if so, replacing this missing value with the value $(Y_1, Y_2, Y_3, \ldots, Y_n)$ of the closest physical quantity that has been recorded if the aforementioned missing value is within a first exclusion zone Bz1, Bz2. In other words, if the value of the physical quantity has not been recorded or has been set to a default value, for any panel position X within domain first exclusion zone Bz1, Bz2, a replacement value may be assigned to this panel position X In this case, this replacement value would be equal to the value Y of the physical quantity recorded at the closest position. Preferably, the value of the closest physical quantity used for replacing the blind zone missing value MiBz is that located towards the closing position P2.

The points (i.e. the values) that were covered during the last panel downward movement are only processed. The example of panel movement is presented in FIG. 4C. The panel movement scenario is as follows. Panel starts its movement from fully closed—position (1). Then opening movement starts and braking begins at position (2) X=−350 ripples. Panel finally stops at position (3) X=−400 ripples. Then panel re-starts opening movement and starts braking at position (4) X=−950 ripples. Finally, panel stops at position (5) X=−1000 ripples. Then panel start closing movement from last position (5) and algorithm for covered points is triggered. Physical quantity $Y_5$ and $Y_6$ for points X: −400 and −500 ripples respectively were not recorded because of transient zone Tz. The points $Y_{11}, Y_{12}, \ldots, Y_n$ were not covered during any downward movement because panel finally stopped at position −1000 ripples. It means that those points are not treated as missing points Mi and are not included in further algorithm processing. Operation of completing points inside the bottom blind zone Bz1 (MiBz) includes the following points: $Y_{11}, Y_{12}, Y_{13}, \ldots, Y_n$. These points value are assigned with the value of the closest physical quantity that has been recorded—$Y_{10}$. It means that $Y_{11}=Y_{12}=\ldots=Y_{n-1}=Y_n=Y_{10}$. Operation of completing points inside the top blind zone Bz2 (MiBz) includes the following points: $Y_1, Y_2, Y_3$. These points were skipped during recording because are covered by blind zone Bz2. These points value are assigned with the value of the closest physical quantity. It means that $Y_1=Y_2=Y_3=Y_4$.

Figure 4B:
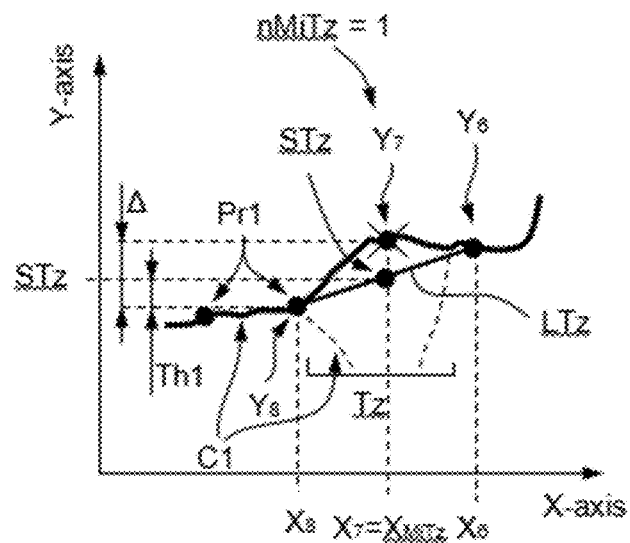
Figure 4C:
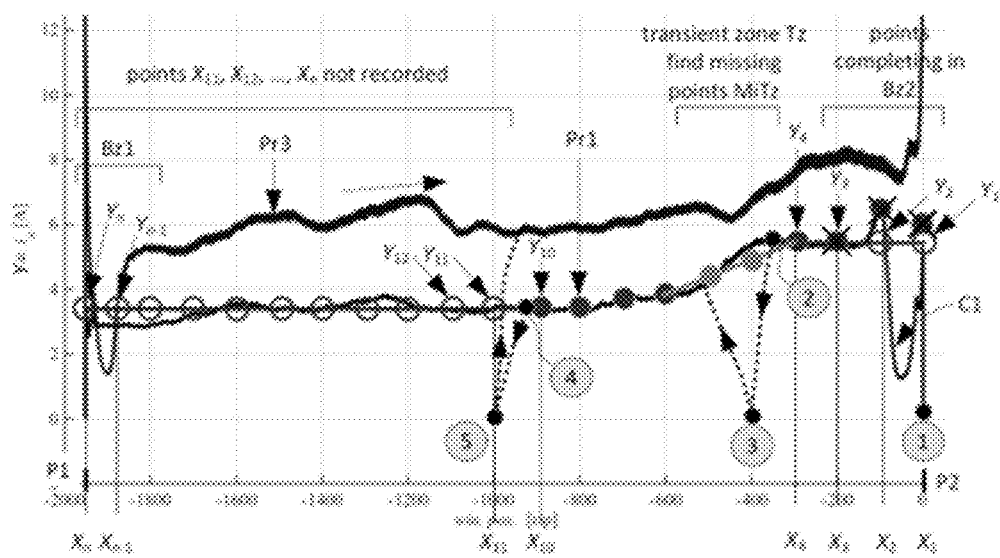

However, if the aforementioned missing value Mi is not located within a first exclusion zone Bz1, Bz1 but is located in a transient zone Tz (i.e. in a second exclusion zone Tz1, Tz2), this missing value is named as transient zone missing value MiTz. FIG. 4B shows an example where the number nMiTz of transient zone missing values MiTz is equal to 1. However, the number nMiTz is not limited to one and could be greater, depending e.g. on the size of the transient zone Tz and/or the step size used for recording the values of the first profile Pr1. In case of transient zone missing value MiTz, the following steps are executed, as schematically shown in FIG. 4B: (i) determining a line segment LTz linking, in the first profile Pr1, the two closest recorded values which are located on both sides of the missing value MiTz (or group of missing values MiTz), and (ii) replacing each missing value MiTz with a substitute value STz corresponding to the value Y defined by the line segment LTz at the panel position X of said missing value MiTz.

Accordingly, and as shown in FIG. 4B, the line segment LTz is a straight line linking the two closest values that have been recorded, namely $Y_6$ and $Y_8$, and which are located on both sides of the missing value(s) MiTz. In this Figure, the missing value MiTz is illustrated by the crossed-out point on the first profile Pr1. The missing value is replaced by the substitute value STz, namely by the value on the Y-Axis of the line segment LTz at panel position $X_{MiTz}$ (on the X-axis) of the missing value MiTz. It should be noted that only the missing values MiTz are replaced by substitute values STz, so that if there is only one missing value MiTz (as shown in FIG. 4B), there will be only one substitute value STz. Accordingly, the number of substitute values STz corresponds to the number nMiTz of missing values MiTz in the transient zone Tz.

According to a preferred embodiment, if the missing value Mi is not within the first exclusion zone Bz1, Bz2 (i.e. in the presence of a transient zone missing value such as that crossed-out in FIG. 4B), the following steps are also performed: (i) checking whether a difference Δ in value of the physical quantity between the two closest recorded values ($Y_6$, $Y_8$ in FIG. 4B) is greater than a first threshold Th1 multiplied by a factor equal to the number nMiTz of missing values MiTz increased by one and, if so, (ii) determining, between said two closest recorded values ($Y_6$, $Y_8$ in FIG. 4B), a plurality of substitute values STz located on the line segment LTz; these substitute values STz being determined according to a step size which is finer (i.e. lower) than the recording step size applied for recording the values ($Y_1$, $Y_2$, $Y_3$, ... $Y_n$) of the physical quantity (ia, n) in the panel-position domain, more specifically when the panel 1 is moved towards the open position P1.

In other words, in this embodiment the number of substitute values STz does no longer depend on the number nMiTz of missing values MiTz. Accordingly, the single missing value MiTz shown e.g. in FIG. 4B may be replaced by a plurality of substitute values STz, each located on the line segment LTz, preferably evenly distributed along this line segment between the two closest recorded values $Y_6$, $Y_8$.

Each of these embodiments allows to complete the missing values in the profiles, especially in the first profile Pr1 which is then duplicated for obtaining e.g. the second profile Pr2 and/or the expected profile PrE, so as to obtain values at regular intervals throughout the profile (i.e. along the entire length of the profile). Still preferably, the step for checking if there is at least one missing value MiTz (nMiTz≥1) and for replacing it, if any, is performed only when the powered movable panel 1 moves towards the closing position P2.

Figure 5:
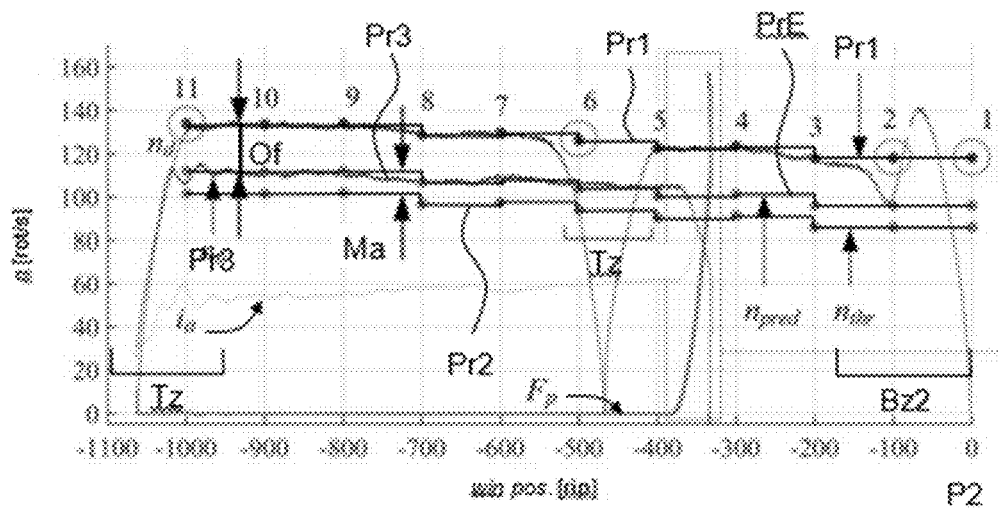
FIG. 5 is a graph similar to that of FIG. 4A but where the window movement speed has been used as physical quantity instead of the armature current, FIGS. 6A and 6B provide respectively a first graph showing areas potentially subject to false pinch detection and a second graph showing one solution to overcome false pinch detections after applying a correction process on a portion of the profiles.

In one embodiment the physical quantity is the panel movement speed or the actuator speed, in particular the motor speed (i.e. the angular or rotational speed of the rotor shaft), instead of the armature current ia of the electric motor used to operate the panel 1. The profiles for such an embodiment are shown in FIG. 5 which shows the upper half portion of the panel-position domain X-axis. In this case, one can note that the first profile Pr1 is generally located above the other profiles (Pr2, Pr3, PrE) given that the rotational speed n of the electric motor actuating the powered movable panel 1 is higher when the panel 1 moves towards the open position P1 than when it moves towards the closed position P2. This is particularly true if the panel 1 has to move along a vertical stroke, as it is the case for a powered window of a vehicle for example. Indeed, since the effort or torque for moving the window 1 downwardly (i.e. towards the open position) is less than the effort or torque required for the reverse movement, the rotational speed n of the motor is higher when the window moves downwards than when it moves upwards. However, if the armature current ia is considered as the physical quantity taken into account in the present method (as shown e.g. in FIG. 4A), the armature current ia will be lower when the window moves downwards than when the window has an upward movement. These differences are mainly caused by the weight of the window.

In the case where the movable panel follows a horizontal stroke, such as the horizontal movement of a sliding door or a sliding roof, the aforementioned difference between opening and closing movement are much less pronounced. Accordingly, the offset value Of will be close to zero and the pinch detection will be even easier, while applying the same algorithm steps.

For information purposes, the graphs shown in FIG. 5 have been obtained under the following conditions: battery voltage: 16V, stiffness ko of the obstacle: 65 N/mm, thickness of the obstacle: 60 mm, location of the obstacle: middle of the window width. In addition, the intensity reported through the armature current ia curve has been multiplied by a factor equal to 10, and the pinching force Fp applied onto the obstacle 4 when the pinch has been detected (i.e. when the third profile Pr3 crosses the second profile Pr2) is equivalent to 43 N, i.e. much lower than a critical threshold of 100 N. Other tests have been made under different conditions, especially using different voltages for energizing the motor (e.g. a battery voltage of 10V), different stiffness of the obstacle (e.g. ko limited to 5 N/m) and different positions of the obstacle 4 along the width of the window 1. Even using such values as extreme cases, it was efficiently possible to detect a pinch pi in a range between 43 N and 62 N, namely always much below the critical value of 100 N.

In the Example of FIG. 5, one can also note that eleven measures of the motor speed (or window speed) have been recorded in order to get the first profile Pr1. Each of the recorded measures has been numbered with one of the numbers 1 to 11 and may be regarded as a measuring point. The speed profile Pr1 of FIG. 5 is a function of the panel position X in the same way as the current profile Pr1 of FIG. 4A is also a function of the panel position X. The motor used for actuating the movable panel may be a DC motor. The transient zone Tz illustrated in FIG. 5, between X=−400 ripples and X=−520 ripples, shows that the motor was stopped during the downward movement of the powered window 1, and then was energized again to continue moving the powered window towards the open position P1. In one embodiment, the measuring point number 6 could be considered as a missing point MiTz since it is located within the transient zone Tz. The same may be applied for point numbers 1 and 2 (MiBz) which are located in blind zone Bz2, as well as for point number 11 (MiTz) which is located in another transient zone Tz.

According to a preferred embodiment, as soon as a pinch pi has been detected, the movement of the movable panel 1 is stopped and/or reversed so as to moves it back to the open position P1. Accordingly, the pinching force applied onto the obstacle 4 is immediately released. It should be noted that there is no need to move back the panel 1 to its fully open position P1 when the pinch has been detected, since a slight movement of the panel toward the open position P1 may fully release the pinching force. Still preferably, once the pinching force is released, or after a small-time interval from the pinching force release, the movement of the movable panel may be stopped. At this stage, the obstacle could be removed in order to keep the window stroke free of any obstacle.

As shown e.g. in FIG. 4A, the first profile Pr1 is made up of a stepped line successively connecting the values Y of the physical quantity, preferably in accordance with the opposite order of their recording. Thanks to such a stepped line, values Y of the first profile Pr1 may be easily provided even between two measured values. In contrast, if all the recorded values were successively linked each other using slanting lines, so as to obtain a first profile according to a broken line, the intermediate values, i.e. the values located between two recorded measures, would be much more complicated to determine. Therefore, using a stepped line for the first profiles, more specifically for the profiles Pr1, Pr2 and PrE if any, allows to improve the anti-pinch algorithm running according to the present method, especially in terms of computing speed and computing resources.

Figure 6A:
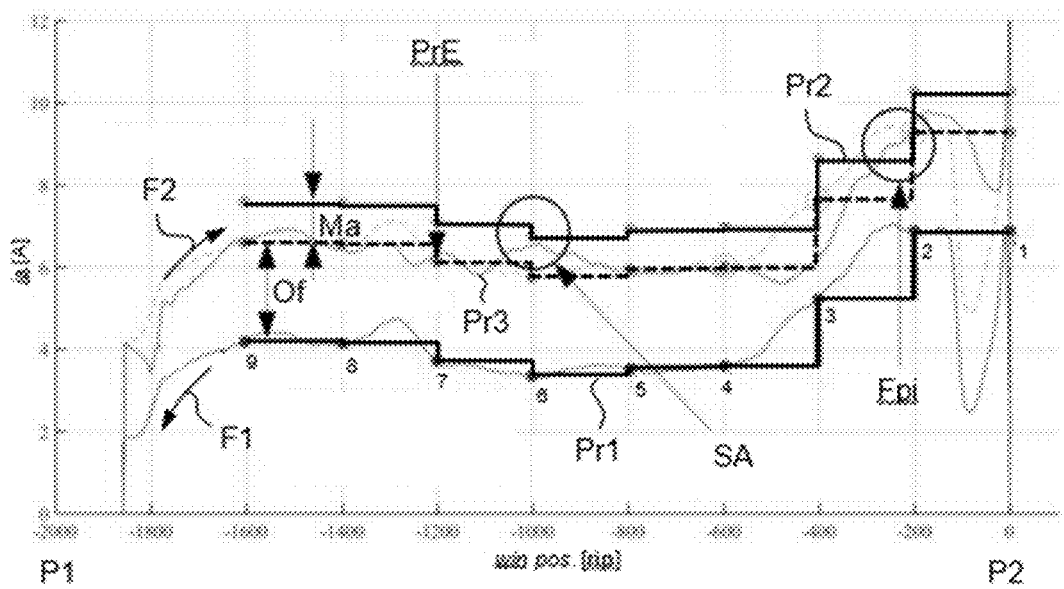

Referring to FIG. 6A, the latter provides a graph example showing a sensitive area SA potentially subject to false pinch Fpi detection. More specifically, at panel position X=−1000 ripples, one can see that the third profile Pr3 is very close to second profile Pr2 which corresponds to the dynamic threshold. Accordingly, in this sensitive area SA, there is a risk that the third profile Pr3 crosses the second profile Pr2 and unduly causes the detection of a pinch pi which can therefore be referred to as false pinch Fpi. Such a critical event occurs near the panel position X=−200 ripples in the example of FIG. 6A. Indeed, in this area (see the circle at −200 ripples), one can note that the third profile Pr3 crosses the horizontal portion of the second profile Pr2 located between −400 and −200 ripples thus causing a false pinch Fpi.

Figure 6B:
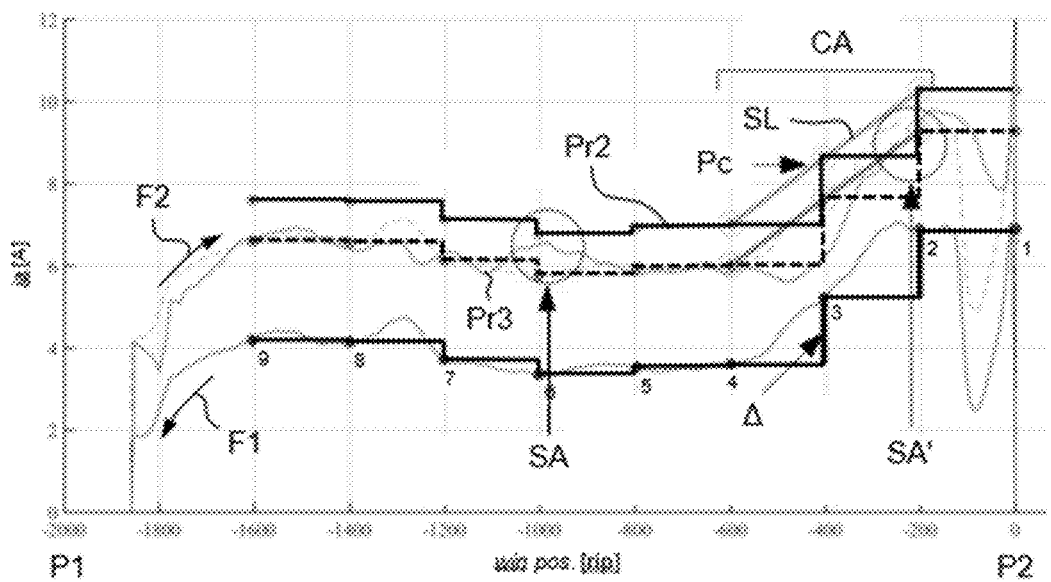

To overcome false pinch detections, FIG. 6B illustrates the effect of a correction process applied on a portion of the profiles, especially on the first profile Pr1 and on the expected profile PrE as well as on the second profile Pr2. It should be noted that, preferably, only the first profile Pr1 is corrected and the remaining profiles PrE and Pr2 are then created on the basis of the first profile Pr1. In this example, the corrected area CA extends between −600 and −200 ripples. In this area, a portion Pc (i.e. a segment or a section to be corrected) of the first profile Pr1 has been modified so that the third profile Pr3 do not cross any more the second profile Pr2 in the sensitive area denoted SA' in FIG. 6B. Accordingly, the correction process intends to correct, if any, at least one portion Pc, segment or section of the first profile Pr1.

Besides, it is also interesting to note, in FIGS. 6A, 6B, that the profile marked as dashed gray line is the profile for previous window closing movement and that this profile does not differ much from the currently considered profile Pr3. This implies that closing movement performed in the same conditions are almost repetitive.

In one embodiment, the correction process has the following main operations. The first operation aims to calculate the differences Δ in value of the physical quantity between each adjacent panel positions X. From these differences, it is possible to identify which of them are greater than or equal to a first threshold value Th1. Those points can be called as points under correction process: points B and C in FIG. 7A disclosed hereafter.

The second operation aims to replace, with a single substitute line segment SL, each portion or set of successive portions Pc of the first profile Pr1 which is bounded by values involved in a difference which is greater or equal to the first threshold value Th1.

Figure 7A:
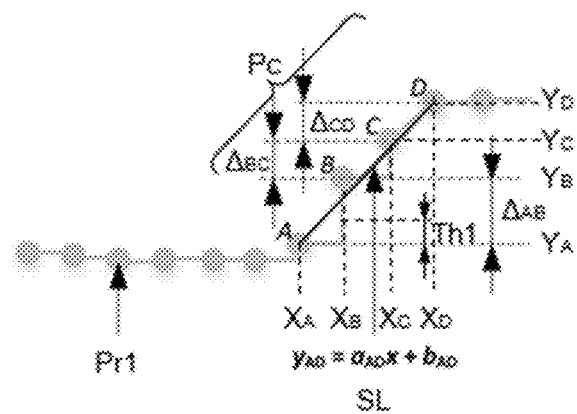
FIGS. 7A to 7C show details regarding correction process that may be applied to a portion of the profile of FIG. 6B.

These two main operations are better shown in FIG. 7A which provides schematized details of FIG. 6B, focused on the correction area CA. In this example, a first correction process CP1 is applied onto the first profile Pr1 illustrated by a grey stepped line where points A, B, C and D have respectively the values $Y_A$, $Y_B$, $Y_C$, $Y_D$ derived from the physical quantity (ia, n), measured at panel positions $X_A$, $X_B$, $X_C$, $X_D$ (e.g. between −600 and −200 ripples) within the panel-position domain X-axis.

As mentioned above, the first operation aims to calculate the difference in value Δ of the physical quantity between each adjacent panel positions X. For this specific correction area CA, this means that the differences in value $\Delta_{AB}$, $\Delta_{BC}$, and $\Delta_{CD}$, are calculated between point pairs AB, BC, and CD. In this example, the first threshold value Th1 is smaller than each of these differences. Accordingly, the second operation is undertaken so as to replace, with a single substitute line segment SL (i.e. a single segment between the two extreme points A and D), the set of successive portions of the first profile Pr1 which is bounded by values used in a difference which is greater or equal to the first threshold value Th1. In the present example, the set of successive portions Pc correspond to the set of successive horizontal portions defined by point pairs AB, BC, and CD. This set of portions are bounded by values $Y_A$ and $Y_D$ which are the values on the Y-axis at points A and D. These values were involved (i.e. used) in the calculation of a difference (see previous operation) that was greater or equal to the first threshold value Th1.

The single substitute line segment SL resulting from the replacement of the stepped lines from points A to D is a straight line, namely a slanted straight line which may be determined by using a mathematical function, especially a linear function of the type Y=aX+b. Accordingly, the linear function $Y_{AD}=a_{AD}X+b_{AD}$ noted in FIG. 7A can be determined on the basis of the coordinates (on Y-axis and X-axis) of points A and D, and where $a_{AD}$ is the slope or gradient of the line SL passing through points A and D, and where $b_{AD}$ represents the Y-intercept, i.e. the vertical intercept of the line SL at the origin of the Cartesian coordinate system defined by X-axis and Y-axis.

In the example of FIG. 6B the substitute line segment SL extends from X=−600 to −200 ripples. Therefore, detecting a potential pinch pi by checking if the third profile Pr3 crosses the second profile Pr2 may be carried out for each measured physical quantity in the panel-position domain between −600 and −200 ripples, by comparing the measured physical quantity (Y value) with the corresponding value (Y value) provided by the linear function $Y_{AD}=a_{AD}X+b_{AD}$ for the related panel position X. Since such comparisons results from mathematical operations, they can be easily achieved e.g. by a dedicated processing device.

Preferably, the aforementioned difference in value Δ is the absolute value of this difference and the first threshold value Th1 is a positive value.

Figure 7B:
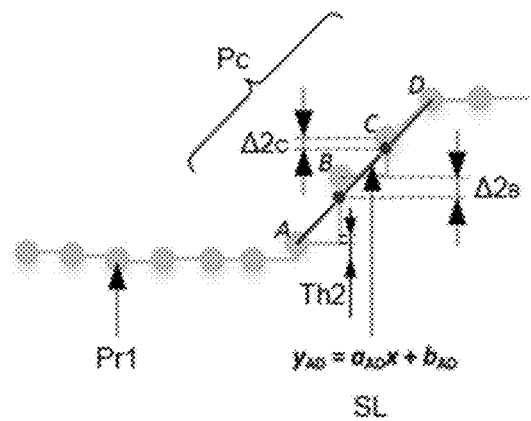

According to another embodiment, the first correction process CP1 further has the following additional operations:

The first additional operation aims to determine, for each substitute line segment SL and at each panel position ($X_B$, $X_C$) crossed by the substitute line segment SL (i.e. extremities excluded), a second difference in value Δ2 of the physical quantity between the first profile Pr1 and the substitute line segment SL. This additional operation is shown at FIG. 7B where the second differences in value are denoted $\Delta2_B$ and $\Delta2_C$. Each of these second differences in value quantifies the gap, in the Y-axis direction, between the first profile Pr1 and the substitute line segment SL at the panel positions $X_B$, $X_C$ corresponding to points B and C, respectively. At the extreme positions $X_A$ and $X_D$, this gap is equal to zero since the substitute line segment SL passes through points A and B. However, this gap may be different from zero for the intermediate panel positions corresponding to points B and C, as shown in FIG. 7B through the second differences in value $\Delta2_B$ and $\Delta2_C$, respectively.

Preferably, the second difference in value Δ2 is the absolute value of the difference in value of the physical quantity between the first profile Pr1 and the substitute line segment SL.

Figure 7C:
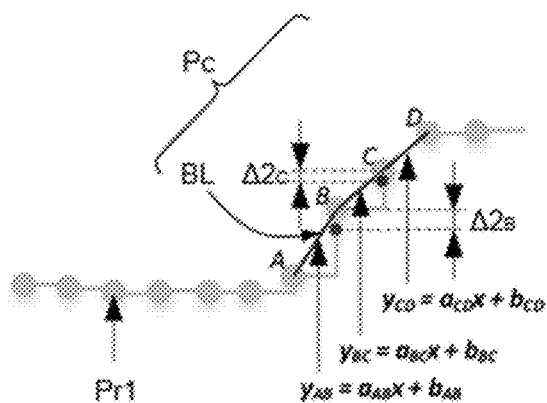

The second additional operation aims to replace the single substitute line segment SL with a broken line BL which successively links, for the portion Pc, each of the values ($Y_B$, $Y_C$) of the physical quantity of the first profile Pr1 which has caused the second difference Δ2 to be greater than or equal to a second threshold value Th2. This second additional operation, named as second correction process CP2, is shown in FIG. 7C where the single substitute line segment SL has been replaced by the broken line BL which is made of three successive straight segments between points A, B, C and D. These three straight segments correspond to the linear functions denoted $Y_{AB}=a_{AB}X+b_{AB}$ for the segment between points A and B; $Y_{BC}=a_{BC}X+b_{BC}$ for the segment between points B and C, and $Y_{CD}=a_{CD}X+b_{CD}$ for the segment between points C and D in FIG. 7C. As a result, the broken line BL passes through the points A, B, C and D. However, the broken line BL may pass through points A, B and D (i.e. without passing through point C) if e.g. the second difference $\Delta 2_C$ was lower than the second threshold Th2. The same is true for point B, and generally speaking for any intermediate points of the broken line BL.

During the step aiming to detect a potential pinch, the same calculations are achieved as those made for the embodiment of FIG. 7C but using to the broken line BL instead of the substitute line segment SL. It should be noted that the number of straight segments of the broken line BL is not limited to three, but mainly depends on the number of intermediate measurement points (here B, and C), between the two extreme measurement points (here A and D), for which the second difference $\Delta 2$ was greater or equal to the second threshold value Th2 (i.e. which generates a second difference $\Delta 2$ greater or equal to the second threshold value Th2).

Advantageously, applying the second correction process CP2 to the portion Pc of the first profile Pr1 in the correcting area allows to further avoid false pinch detections since the portion Pc of this second profile is replaced by a broken line BL having a shape that is more similar to the shape of the third profile Pr3 in this critical area (CA) of the time or panel-position domain.

Whatever the embodiment of the correction process applied to prevent false pinch detections, this process is more efficient than providing a smaller step size (e.g. a step size of 100 ripples instead of 200 ripples) during data recording, namely during recording the values Y of the physical quantity so as to get the first profile Pr1 (see first step of the method).

The first threshold value Th1 as well as the second threshold value Th2 are preferably determined in advance and may be derived from a calculation where the physical quantity (i.e. the armature current ia) is multiplied by a certain factor. Besides, the first and second threshold values Th1, Th2 are preferably different, especially thanks to their factors.

Figure 8:
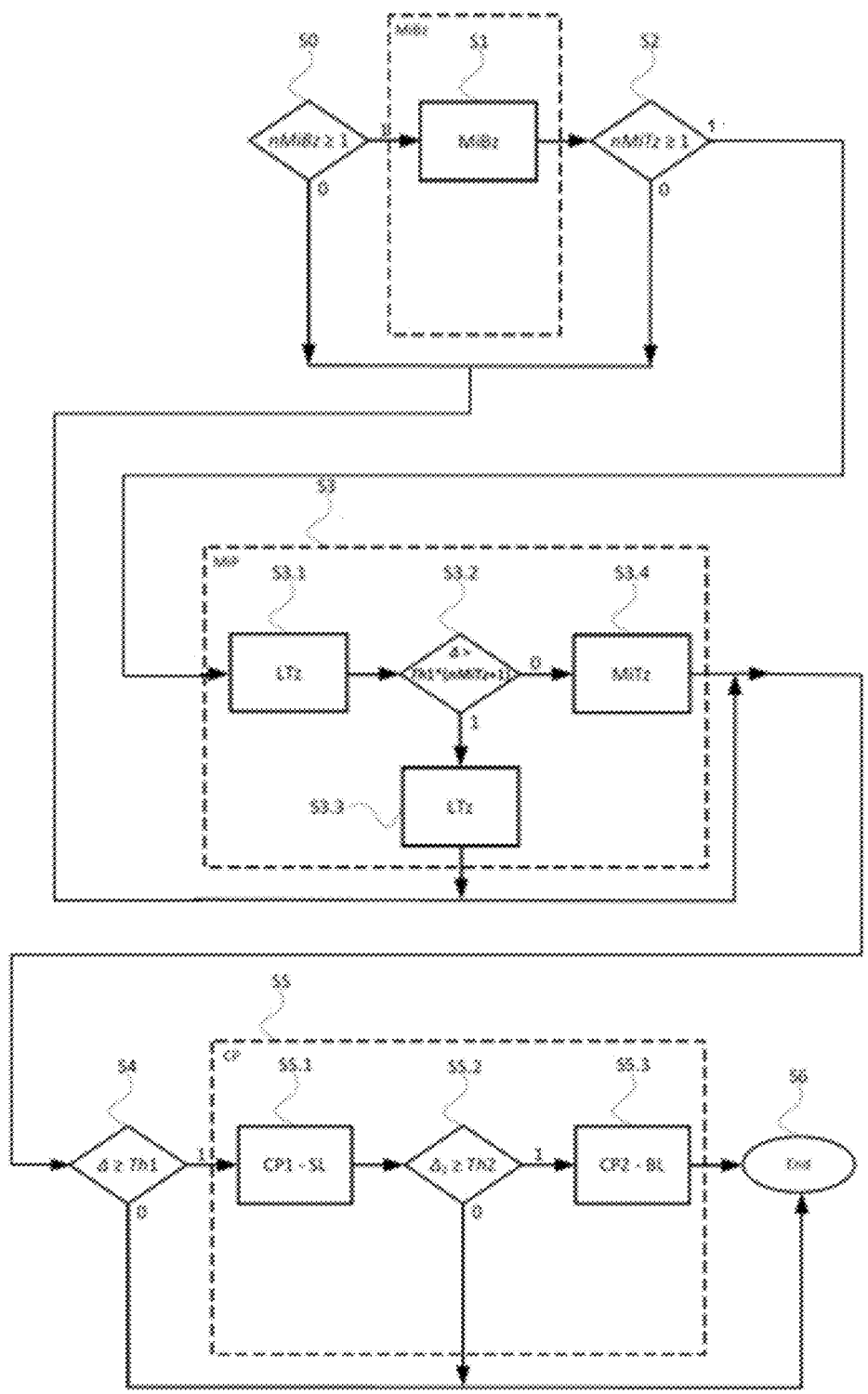
FIG. 8 shows a flowchart of the correction process according to one embodiment, and FIG. 9 provides a schematic representation of a pinch detector for implementing the method of the present solution, as well as a vehicle including such a pinch detector and a computer-readable medium including instructions for causing a processor to execute the method of the present solution.

Referring to FIG. 8, it shows a flowchart of the profile correction process according to a preferred embodiment. The example presented in FIG. 4B shows one missing value $Y_7$ (nMiTz=1) and values of extreme recorded points are marked as: $Y_8$ and $Y_6$.

The step S0 of the profile correction process, according to this preferred embodiment, aims to check the condition if there is at least one missing point inside blind zone Bz1, Bz2. The number of missing points inside blind zones is described by variable nMiBz. If the answer to this first test is "Yes" (i.e. the first test provides e.g. a binary value 1, according to the chart in FIG. 8), then step S1 relating to the blind zone missing points processing (MiBz) begins. If the answer to this first test is "No" (i.e. the first test provides a binary value 0, according to the chart in FIG. 8), then fourth test in step S4 begins.

The step S1 aims to complete missing values of the profile Pr1 within the blind zones Bz1, Bz2 (MiBz), namely near the extremities of the profiles. The aforementioned profile Pr1 is shown in profile correction process illustrated as an example in FIG. 4C.

The second test in step S2 checks the condition if there is at least one missing point inside transient zone Tz. The number of missing points inside transient zones is described by variable nMiTz. If the answer to this second test is "Yes" (i.e. the second test provides a binary value 1, according to the chart in FIG. 8), then step S3 transient zone missing points processing (MiP) begins. If the answer to this second test is "No" (i.e. the second test provides a binary value 0, according to the chart in FIG. 8), then fourth test in step S4 begins.

Step S3—transient zone missing points processing (MiP) starts with determining a line segment LTz linking (step S3.1), in the first profile Pr1, the two closest recorded values which are located on both sides of the missing values MiTz. According to the example of FIG. 4B, the aforementioned two closest recorded values are $Y_6$ and $Y_8$ since they are located on both sides of the single missing value which should be located at panel position $X_{MiTz}$ (i.e. at position $X_7$ in FIG. 4B).

Step S3.2 includes third test, which determines the difference $\Delta$ between the two extreme recorded points, namely $Y_6$ and $Y_8$ respectively located at panel positions $X_8$, $X_6$ in the example of FIG. 4B. In this particular case, the difference $\Delta$ can be taken as an average difference between adjacent points $Y_8$, $Y_7$, $Y_6$ (FIG. 4B). If the aforementioned differences $\Delta$ is greater than the first threshold value Th1 multiplied by a factor equal to the number of missing points nMiTz increased by one (i.e. the answer to this third test is "Yes" so that a binary value 1 is provided): (i) then step S3.3 starts and previously determined line segment LTz is used to determined physical quantity Y between two recorded extreme points for any X-position between these extreme points; line segment LTz being a linear function of the type $y_{AD}=a_{AD}x+b_{AD}$ (similar to the linear function shown e.g. in FIG. 7A). More specifically, a plurality of substitute values STz located on the line segment LTz is determined between the two closest recorded values (i.e. the two recorded extreme points); these substitute values STz being determined according to a step size which is finer than the recording step size applied for recording the value of the physical quantity in the panel-position domain. (ii) If condition S3.2 is not met (the answer to this third test is "No" and a binary value 0 is provided) then step S3.4 relating to missing points inside transient zone (MiTz) is done; it means that the average difference between adjacent points: $Y_8$, $Y_7$, $Y_6$ (FIG. 4B) is so small that only missing points can be determined: point STz in FIG. 4B. It should be noted that there can be more than one transient zone Tz when opening the panel (i.e. panel goes toward open position P1). For example, several transient zones appear when there are several stops while the panel is being open. Also, no transient zone Tz may occur. For example, when the panel is being opened from fully closed (position P2) then it is stopped, and the next movement is a closing movement of the panel.

The step S4 firstly aims to calculate the differences in value $\Delta$ of the physical quantity between each adjacent panel positions X. Preferably, these differences in value $\Delta$ are calculated throughout the entire profile (here Pr1), namely for all values of this profile corresponding to a panel position for which a measured value has been recorded in view to obtain the first profile Pr1. Secondly, in step S4 of the fourth test, it is determined whether there is at least one difference in value $\Delta$ which is greater than or equal to the first threshold value Th1. If the answer to this fourth test is "Yes" (i.e. the fourth test provides a binary value 1, according to the chart in FIG. 8), then step S5 relating to the correction process (CP) begins. If the answer to this fourth test is "No" (i.e. the fourth test provides a binary value 0, according to the chart in FIG. 8), then profile correction process ends at step S6.

At the beginning of the correction process, step S5 starts with first correction process (CP1) in step S5.1. The goal of step S5.1 is to determine the substitute line segment SL (FIG. 7A). The goal of step S5.2 is first to determine, for the substitute line segment SL and at each panel position ($X_B$, $X_C$ in FIG. 7B) crossed by the substitute line segment SL (extremities excluded), a second difference in value $\Delta 2$ of the physical quantity between the first profile Pr1 and the substitute line segment SL. Secondly, the goal of step S5.2 is then to determine, as fifth test, whether the second difference in value Δ2 is greater than or equal to the second threshold value Th2. Then if the answer at fifth test in step S5.2 is "Yes" (binary value 1 in FIG. 8) then second correction process (CP2) begins at step S5.3. The goal of this step is to determine broken line BL for point under correction where second difference Δ2 is greater or equal to second threshold value Th2 (e.g. between points pairs AB, BC and CD as shown in FIG. 7C). However, if the answer at the fifth test in step S5.2 is "No", the correction process (CP) ends at step S6. The same happens at the end of step S5.3.

Figure 9:
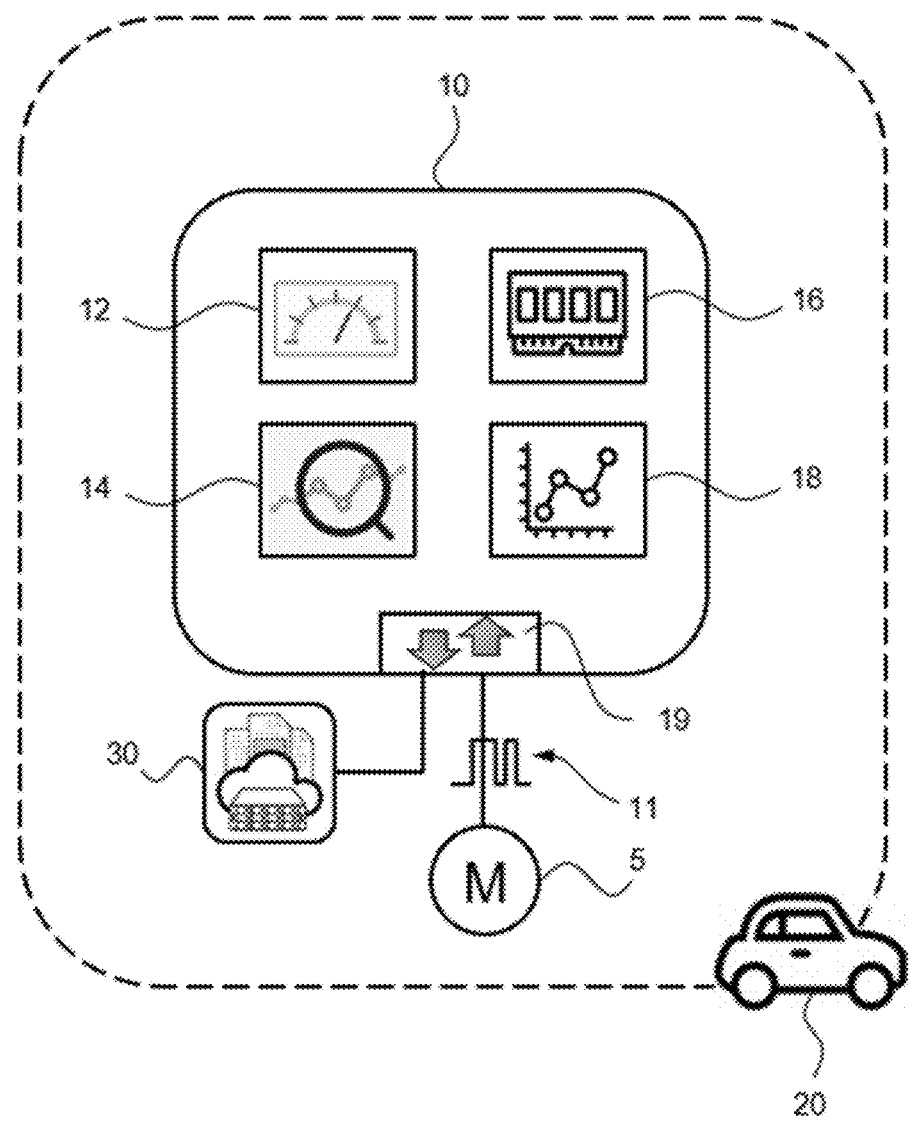

According to a second aspect schematically depicted in FIG. 9, the present solution relates to a pinch detector 10 for implementing the aforementioned method according to any of its embodiment, or any possible combination of its embodiments, previously disclosed. Accordingly, the pinch detector 10 implements the method for detecting potential pinches caused by at least one powered panel 1. For example, the pinch detector 10 may implement the method for detecting potential pinches pi between a powered movable panel 1 and a fixed frame 2 relative to the aforementioned panel 1. The latter is movable by an actuator 5 in a panel-position domain X-axis between a closed position P2 and an open position P1. The actuator 5 may be typically an electric motor, e.g. a DC motor. The movable panel 1 is typically a powered window of a vehicle for example.

The pinch detector 10 has: (i) a first measuring device 12 for obtaining or carrying out measurements of a physical quantity (ia, n) representative of a panel movement, (ii) a second measuring device 14 for receiving, obtaining, or determining measurements of panel positions X in the panel-position domain (X-axis), typically during panel movements, (iii) a saving device 16 for storing values provided by the first measuring device 12 in relationship with the panel positions X provided by the second measuring device 14, and (iv) a processing device 18 for at least performing calculation tasks and determining profiles (Pr1, Pr2, Pr3, PrE) of the physical quantity in the panel-position domain, at least a part of these profiles being determined using mathematical functions applied on the values of the physical quantity and on the panel positions X.

The first measuring device 12 may be a device which measures the physical quantity representative of the panel movement or may be a means, such as a communication line, for obtaining the measurements from a remote device via an appropriate signal. The same is true regarding the second measuring device 14, which may be a communication means for receiving signals providing the panel positions X from a remote device, as well as regarding the saving device 16 which may be a communication means for sending data to a remote storage means for instance.

Any communication may be exchanged using a communication interface 19 located in the pinch detector 10. The processing device 18 is typically a processor or a chipset which may have at least one memory, e.g. for the temporary storage of calculations values and/or for the permanent storage of predefined values such as threshold values and other parameters for example. The processing device 18 may be further designed to execute program instructions for the implementation of the aforementioned method. The saving device 16 may be a storage device for storing values Y provided by the first measuring device together with panel positions X, so that each of said values Y being stored in relationship with one of said panel positions X. The pinch detector 10 may be connected to the actuator 5 or may include the actuator 5 used for moving the powered movable panel 1.

According to one embodiment, the pinch detector 10 generates a control signal 11 for controlling at least one of the two actions of stopping the movement of the powered movable panel 1 and moving the powered movable panel 1 towards the open position P1.

According to a third aspect, the present solution relates to a vehicle 20 including the pinch detector 10 as shown in FIG. 9. Typically, the vehicle 20 is a motor vehicle and the powered movable panel 1 is at least one of a window, a sliding door, and a sliding roof of the vehicle 20.

According to a fourth aspect, the present solution relates to a non-transitory computer-readable medium 30 storing program instructions that, when executed by a computer, cause it to perform the method disclosed in the present description according to any of its embodiments or possible combination of its embodiments.

For all purposes, it should be understood that sound effects may be referred to as sounds and that hazards may be referred to as dangers. Also, although an overview of the inventive subject matter has been described with reference to specific example embodiments, various modifications and changes may be made to these embodiments without departing from the broader spirit and scope of embodiments of the solution disclosed in the present description.

What is claimed is:

1. A method for detecting potential pinches caused by a panel, the method comprising:
measuring a physical quantity at a plurality of panel positions as the panel is moved towards an open position and recording related values of the physical quantity, the panel being movable in a panel-position domain between a closed position and the open position, the physical quantity representative of a movement of the panel in the panel-position domain, the related values providing a first profile of the physical quantity in the panel-position domain;
measuring the physical quantity in a reference position as the panel is moved towards the closed position, the reference position being at least one of the panel positions;
determining, for the reference position, an offset value between a value of the physical quantity measured as the panel is moved towards the closed position and another value of the physical quantity measured as the panel was moved towards the open position;
determining a second profile by shifting the first profile by a shifting value derived from the offset value;
measuring the physical quantity in a repetitive manner in the panel-position domain as the panel is moved towards the closed position to obtain a third profile; and
detecting a potential pinch in response to the third profile crossing the second profile.

2. The method of claim 1, wherein the panel-position domain has at least one first exclusion zone, the first exclusion zone being at least bounded by one of extremities of the panel-position domain.

3. The method of claim 2, wherein:
the at least one first exclusion zone includes two first exclusion zones;
one of the first exclusion zones extends over a range of 4 millimeters (mm) from a fully closed position; and
another first exclusion zone extends over a range from a fully open position that does not extend beyond 200 mm from the fully closed position.

4. The method of claim 2, further comprising:

checking whether there is at least one missing value; and in response to there being at least one missing value, replacing the missing value with the value of a closest physical quantity that has been recorded in response to the missing value being within one of the at least one first exclusion zone; or in response to the missing value not being within one of the at least one first exclusion zone, determining a line segment linking, in the first profile, two closest recorded values which are located on both sides of the missing value and replacing each missing value with a substitute value corresponding to the value defined by the line segment at the panel position of the missing value.

5. The method of claim 4, wherein:

in response to the missing value not being within the first exclusion zone, further checking whether a difference in value of the physical quantity between the two closest recorded values is greater than a first threshold multiplied by a factor equal to a number of missing values increased by one; and in response to the difference in value of the physical quantity between the two closest recorded values being greater than the first threshold multiplied by the factor equal to the number of missing values increased by one, determining, between the two closest recorded values, a plurality of substitute values located on the line segment and determined according to a step size that is finer than a recording step size applied for recording the values of the physical quantity in the panel-position domain.

6. The method of claim 1, wherein the potential pinch is detected in response to the third profile crossing the second profile during at least a predetermined time interval.

7. The method of claim 1, wherein measuring the physical quantity as the panel is moved towards the closed position is carried out on a substantially continuous basis or according to a measuring size that is lower than a recording step size applied for recording, on a punctual basis, the values of the physical quantity as the panel is moved towards the open position.

8. The method of claim 1, wherein the physical quantity is at least one of a panel movement speed or an armature current of an electric motor used to operate the panel.

9. The method of claim 1, wherein the first profile comprises a stepped line successively connecting the values of the physical quantity.

10. The method of claim 9, further comprising a correction process to correct at least one portion of the first profile, the correction process comprising:

calculating differences in value of the physical quantity between each adjacent panel position; and performing a first correction process to replace, with a single substitute line segment, each portion or set of successive portions of the first profile that is bounded by values involved in a difference in value that is greater or equal to a first threshold value.

11. The method of claim 10, wherein the correction process further comprises:

determining, for each substitute line segment and at each panel position crossed by the substitute line segment, a second difference in value of the physical quantity between the first profile and the substitute line segment, and performing a second correction process to replace the substitute line segment with a broken line that successively links, for the portion, each of the values of the physical quantity of the first profile that has caused the second difference in value to be greater or equal to a second threshold value.

* * * * *